United States Patent
Prater

Patent Number: 6,035,737
Date of Patent: Mar. 14, 2000

[54] ASSEMBLY HAVING AN OUTER BAND MEMBER SECURED TO AN INNER HOUSING

[75] Inventor: Ronald E. Prater, Rochester, Mich.

[73] Assignee: Koppy Corporation, Orion, Mich.

[21] Appl. No.: 09/262,254

[22] Filed: Mar. 4, 1999

Related U.S. Application Data

[63] Continuation of application No. 08/946,822, Oct. 8, 1997, Pat. No. 5,906,135.

[51] Int. Cl.⁷ .............................. B21D 39/00; F16H 55/00
[52] U.S. Cl. .............................. 74/446; 29/521; 29/522.1; 29/523; 29/893.1; 29/893.2; 403/359; 403/375; 192/70.2
[58] Field of Search ................................ 74/446; 29/521, 29/522.1, 523, 893.1, 893.2; 403/359, 375; 192/70.2

[56] References Cited

U.S. PATENT DOCUMENTS

| | | |
|---|---|---|
| 277,427 | 5/1883 | Recht .................................... 29/523 X |
| 779,896 | 1/1905 | Wood, Jr. .............................. 29/523 X |
| 3,780,601 | 12/1973 | Dach et al. . |
| 3,841,452 | 10/1974 | Newsock et al. . |
| 3,922,932 | 12/1975 | Maurice et al. . |
| 4,014,619 | 3/1977 | Good et al. . |
| 4,089,097 | 5/1978 | Good et al. . |
| 4,716,756 | 1/1988 | Fujioka et al. . |
| 4,813,522 | 3/1989 | Fujioka et al. . |
| 4,945,782 | 8/1990 | Farrell . |
| 5,069,575 | 12/1991 | Anderson . |
| 5,078,536 | 1/1992 | Anderson . |
| 5,180,043 | 1/1993 | Walker . |
| 5,267,807 | 12/1993 | Biedermann et al. . |
| 5,305,943 | 4/1994 | Walker . |

FOREIGN PATENT DOCUMENTS

2580349A1  4/1985  France .

*Primary Examiner*—Allan D. Herrmann
*Attorney, Agent, or Firm*—Howard & Howard

[57] ABSTRACT

A transmission assembly includes an inner housing member and an outer band member. The outer band member is slidingly received over the outer surface of the inner housing member. An inner surface of the outer band member includes a plurality of notches. After the outer band member is placed in a desired radial and axial alignment with the inner housing member, a plurality of deformations are lanced in the inner housing member. The deformations extend radially outward into the notches formed in the band member. The cooperation between the lanced deformations and the notches maintain the two pieces of the transmission assembly in an desired axial and radial alignment.

9 Claims, 2 Drawing Sheets

ASSEMBLY HAVING AN OUTER BAND MEMBER SECURED TO AN INNER HOUSING

This is a continuation of 08/946,822 filed Oct. 8, 1997, now U.S. Pat. No. 5,906,135 issued May 25, 1999.

BACKGROUND OF THE INVENTION

This invention generally relates to a vehicle transmission assembly having a power take off gear attached to the outside of an inner housing member.

In some automotive vehicle transmissions, a power take off gear is provided on the outside of a clutch housing member. In most instances the power take off gear is welded onto the outside of the clutch housing member. While such an arrangement has proven useful for many applications, it is not without shortcomings and drawbacks. For example, a welding process typically includes the formation of a flash on the exterior of the clutch housing that must be removed. Introducing an additional step of removing the undesirable flash during the manufacturing process adds additional labor and expense. Another shortcoming of welded arrangements is that the welding process can weaken or otherwise compromise the integrity of the clutch housing and/or the power take off gear especially when the welding process is not accurately or properly performed. A further difficulty is sometimes encountered when a secure weld is not achieved.

There is a need for an assembly process and an arrangement that results in a more efficient and reliable configuration. This invention addresses those needs by providing a transmission assembly that overcomes the drawbacks and shortcomings of the conventional arrangements.

In general terms, this invention is a transmission assembly having an inner housing member and an outer band member. The outer band member can be, for example, a power take off gear. The inner housing member preferably includes a plurality of circumferentially spaces splines on an inner surface of the housing member. An inner surface of the outer band member includes a plurality of grooves or notches. The outer band member is slid over the outer surface of the inner housing member and the two pieces are placed in a desired axial and radial alignment. A plurality of deformations are then formed in the inner housing member that protrude radially outward into the notches of the inner band member. The deformations preferably are lanced, using a lancing tool that acts upon the interior of the inner housing member. The placement of the deformations within the notches on the outer band member serves to maintain the outer band member in a proper axial and radial alignment with the inner housing member.

The various features and advantages of this invention will become apparent to those skilled in the art from the following detailed description of the presently preferred embodiments. The drawings that accompany the detailed description can be described as follows.

DETAILED DESCRIPTION OF THE PREFERRED EMBODIMENTS

Figure 1:
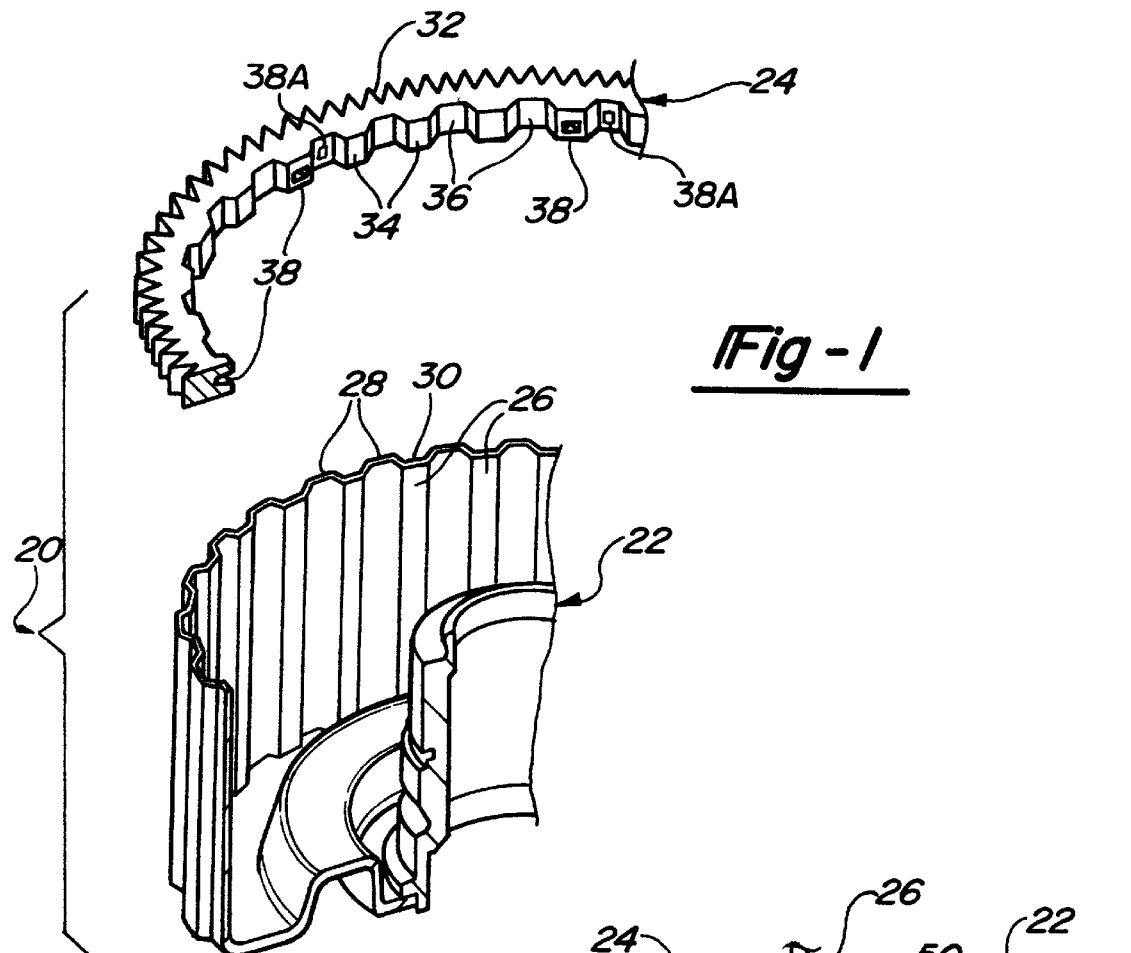
FIG. 1 is a perspective, exploded illustration of a transmission assembly designed according to this invention.

FIG. 1 illustrates a transmission assembly 20 that includes an inner housing member 22 and an outer band member 24. The inner housing member 22 preferably is generally cylindrical in shape. In this example, the inner housing member 22 is a transmission clutch housing. The inner housing member 22 includes a plurality of splines 26 on an inner surface of the outermost portion of the housing member 22. An outer surface includes a plurality of splines 28 that are interdigitated with a plurality of grooves 30. The grooves 30 are aligned with the splines 26 as can be appreciated from the drawing.

The outer band member 24 is often referred to as a power take off gear. The outer band member includes an outer surface 32 that has a plurality of gear teeth. An inner surface of the band member 24 includes a plurality of keys 34. The keys 34 are circumferentially spaced around the inner surface of the band member 24 with a plurality of spacers 36 in between the keys 34.

A plurality of grooves or notches 38 are formed on the inner surface of the band member 24. In the illustrated embodiment, the notches 38 are formed on the keys 34 of the band member 24. Alternatively, the notches 38 could be formed on the spacer portions 36 as shown at 38A in FIG. 1. The inner housing member 22 and the outer band member 24 preferably are both annular.

Figure 2:
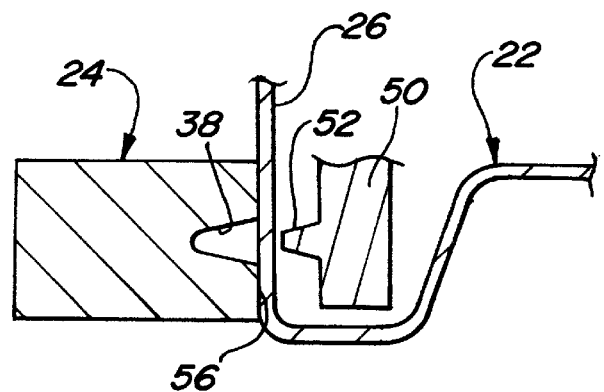
FIG. 2 is a cross-sectional illustration of selected portions of the embodiment of FIG. 1.

FIG. 2 illustrates, in cross-sectional view, selected portions of the embodiment of FIG. 1. The outer band member 24 has been slid over the outer portion of the inner housing member 22. FIG. 2 schematically illustrates a lancing tool 50 that has a radially outward projection 52. The lancing tool 50 preferably is aligned with the portion of an inner housing member inner surface spline 26 that is coincident with a notch 38. The lancing tool 50 is then moved radially outward to deform the appropriate portion of the inner housing member 22. A deformation 54 (illustrated in FIG. 3) is formed and extends outwardly into the notch 38. In the preferred method of this invention, a single deformation 54 is formed at one time and the lancing tool 50 is then indexed into position to lance additional deformations into each of the notches 38.

Figure 3:
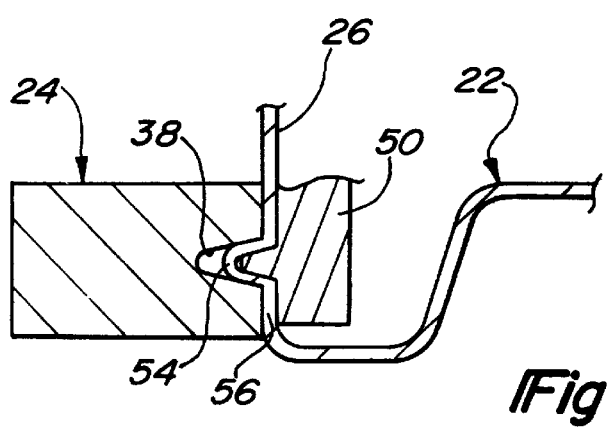
FIG. 3 illustrates the embodiment of FIG. 2 at a later stage during the preferred manufacturing process.

As illustrated in FIGS. 2 and 3, the notches 38 preferably are axially aligned on the inner surface of the band member 24 such that an abutment surface 56 is adjacent either axial side of the notch 38. The abutment surfaces 56 serve to engage the outer surface of the inner housing member 22 so that when the deformation 54 is formed by the lancing tool 50, the adjacent portions of the inner housing member 22 are not deformed in an undesirable manner.

Figure 4:
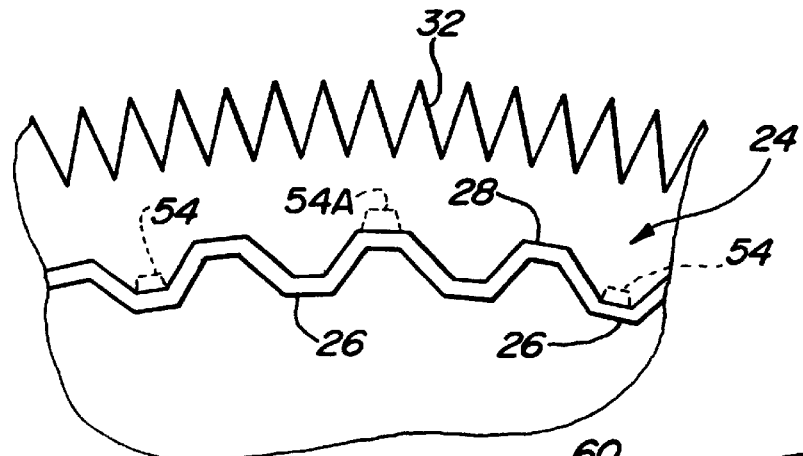
FIG. 4 is a top elevational view of a selected portion of a transmission assembly designed according to this invention.
Figure 5:
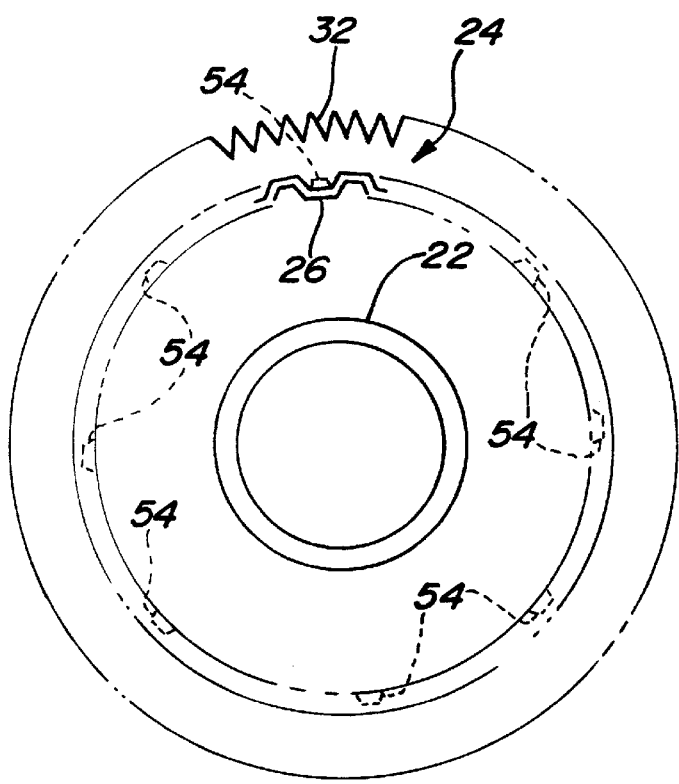
FIG. 5 is a top elevational view of a completed assembly.

FIGS. 4 and 5 illustrate a completed assembly showing how the deformations 54 (shown in phantom) protrude outward from the interior of the inner housing member 22 and into the notches 38. Alternatively, deformations 54a correspond to notches 38a provided on the spaces 36. Any number of notches 38 can be used, however, it has been found that at least three notches should be provided.

Figure 6:
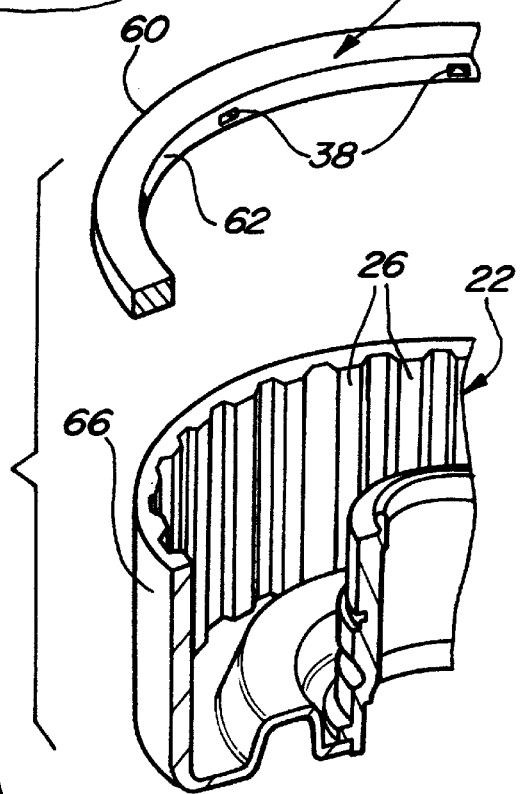
FIG. 6 is an exploded, perspective, exploded illustration of a second embodiment of a transmission assembly designed according to this invention.

FIG. 6 is an exploded, perspective illustration of another embodiment of this invention. The main differences between the embodiments of FIGS. 1 and 6 is that the embodiment of FIG. 6 includes an outer band member 24 that has a generally smooth outer surface 60 and a generally smooth inner surface 62. The diameters of the outer surface 60 and inner surface 62 preferably are each constant along the entire periphery of the outer band member 24. The inner housing member 22 includes a generally smooth outer surface 66 that preferably has a constant outer diameter. The outer band member 24 is slid onto the outer surface of the inner housing member 22 and a plurality of deformations are formed so that the outer band member 24 and the inner housing member 22 are maintained in a desired radial and axial alignment.

One difference between the embodiments of FIG. 6 and FIG. 1 is that the nesting fit between the keys 34 and the grooves 30 and the splines 28 with the spacer portions 36 in the latter serve to maintain a radial alignment between the inner housing member 22 and the outer band member 24. Since the outer surface 66 of the inner housing member 22 and the inner surface 62 of the outer band member 24 (in the embodiment of FIG. 6) do not include interdigitated splines or keys, the deformations 54 within the notches or grooves 38 serve as the sole structure that maintains both radial and axial alignment between the inner housing member 22 and the outer band member 24.

A significant reduction in manufacturing tooling and labor costs can be realized by making transmission assemblies according to this invention. The further advantage of realizing an efficient and stable coupling of the inner housing and outer band member is realized.

The foregoing description is exemplary rather than limiting in nature. Variations and modifications to the disclosed embodiments may become apparent to those skilled in the art that do not necessarily depart from the purview and spirit of this invention. Accordingly, the legal scope of protection afforded this invention can only be determined by studying the following claims.

What is claimed is:

1. An assembly, comprising:
    an inner housing member having an outer surface and an inner surface for housing at least one vehicle drive line component;
    an outer band member having an inner surface with at least one notch formed through said band member inner surface such that said notch extends into said band member in a generally radially outward direction, said band member inner surface being received about said outer surface of said inner housing member; and
    wherein said inner housing includes at least one deformation that is formed from within said inner housing such that said deformation extends generally radially outward from said housing member outer surface into said outer band member notch whereby said outer band member is maintained in a selected position relative to said inner housing member.

2. The assembly of claim 1, wherein there are a plurality of deformations on said inner housing member.

3. The assembly of claim 2, wherein there are a plurality of notches formed on said inner surface of said band member.

4. The assembly of claim 1, wherein said inner housing deformations are lanced portions of said inner housing.

5. The assembly of claim 1, wherein said inner housing outer surface has a generally constant outer diameter and said outer band member inner surface has a generally constant inner diameter that is slightly larger than said housing outer diameter and wherein said notch and said deformation cooperate to maintain said outer band member in a selected axial alignment with said inner housing member.

6. The assembly of claim 5, including a plurality of deformations on said inner housing member and a corresponding plurality of notches on said outer band member and wherein said notches and said deformations cooperate to maintain said outer band member in a selected radial alignment with said inner housing member.

7. The assembly of claim 1, including a plurality of splines on said inner surface of said housing member.

8. The assembly of claim 1, wherein said inner housing member outer surface includes a plurality of spline portions interspersed with a plurality of grooves and wherein said outer band member inner surface includes a plurality of keys interdigitated with a plurality of spacers, said keys being received within said grooves.

9. The assembly of claim 1, wherein the inner housing member is a clutch housing and the at least one vehical drive line component comprises a plurality of clutch plates.

* * * * *